United States Patent
Shiao et al.

(10) Patent No.: US 10,443,242 B2
(45) Date of Patent: Oct. 15, 2019

(54) SURFACING MEDIA WITH FLAME RETARDING EFFECTS AND HIGH SOLAR REFLECTANCE, AND METHOD OF MAKING SAME

(71) Applicant: CertainTeed Corporation, Valley Forge, PA (US)

(72) Inventors: Ming Liang Shiao, Collegeville, PA (US); Barbara A. McDonough, Gilberstville, PA (US); Gregory F. Jacobs, Oreland, PA (US)

(73) Assignee: CERTAINTEED CORPORATION, Malvern, PA (US)

(*) Notice: Subject to any disclaimer, the term of this patent is extended or adjusted under 35 U.S.C. 154(b) by 391 days.

(21) Appl. No.: 14/665,946

(22) Filed: Mar. 23, 2015

(65) Prior Publication Data

US 2015/0218823 A1  Aug. 6, 2015

Related U.S. Application Data (62) Division of application No. 12/059,194, filed on Mar. 31, 2008, now abandoned.

(60) Provisional application No. 60/909,876, filed on Apr. 3, 2007.

(51) Int. Cl.
| | |
|---|---|
| *E04D 11/02* | (2006.01) |
| *B05D 5/02* | (2006.01) |
| *B05D 7/00* | (2006.01) |
| *E04D 1/20* | (2006.01) |
| *E04D 5/12* | (2006.01) |
| *B05D 5/00* | (2006.01) |
| *E04D 5/10* | (2006.01) |
| *E04D 1/00* | (2006.01) |

(52) U.S. Cl.
CPC ............... *E04D 11/02* (2013.01); *B05D 5/00* (2013.01); *B05D 5/02* (2013.01); *B05D 7/52* (2013.01); *E04D 1/20* (2013.01); *E04D 5/10* (2013.01); *E04D 5/12* (2013.01); *B05D 2601/00* (2013.01); *E04D 2001/005* (2013.01); *Y02A 30/255* (2018.01); *Y02B 80/34* (2013.01); *Y10T 428/24355* (2015.01); *Y10T 428/2989* (2015.01)

(58) Field of Classification Search
CPC ........................................................ E04D 11/02
See application file for complete search history.

(56) References Cited

U.S. PATENT DOCUMENTS

| | | |
|---|---|---|
| 2,379,358 A | 6/1945 | Jewett |
| 2,417,058 A | 3/1947 | Buzzel et al. |
| 2,591,149 A | 4/1952 | Grove |

(Continued)

FOREIGN PATENT DOCUMENTS

JP    2004-162482 A    6/2005

OTHER PUBLICATIONS

G. Beestman, "Microencapsulation of Solid Particles," Controlled-Release Delivery Systems for Pesticides,(H. B. Scher, Ed., Marcel Dekker, Inc., New York 1999) pp. 31-54.

(Continued)

*Primary Examiner* — Xiao S Zhao
(74) *Attorney, Agent, or Firm* — McDonnell Boehnen Hulbert & Berghoff LLP (57) ABSTRACT

A roofing material includes a fire-retardant particulate material on its upper surface. A solar-reflective surface coating encapsules the fire-retardant particulate.

16 Claims, 3 Drawing Sheets

(56) References Cited

U.S. PATENT DOCUMENTS

| | | | |
|---|---|---|---|
| 2,614,051 A | 10/1952 | Buzzell et al. | |
| 2,695,851 A | 11/1954 | Lodge | |
| 2,732,311 A | 1/1956 | Hartwright | |
| 2,898,232 A | 8/1959 | Miller et al. | |
| 2,927,045 A | 3/1960 | Lodge et al. | |
| 2,981,636 A | 4/1961 | Lodge et al. | |
| 2,986,476 A | 5/1961 | Larrsen | |
| 3,255,031 A | 6/1966 | Lodge et al. | |
| 3,475,191 A | 10/1969 | Lodge et al. | |
| 3,507,676 A | 4/1970 | McMahon | |
| 4,092,441 A | 5/1978 | Meyer et al. | |
| 4,218,502 A | 8/1980 | Graham et al. | |
| 4,234,639 A * | 11/1980 | Graham | B32B 11/02 106/18.12 |
| 4,287,248 A | 9/1981 | Gessner et al. | |
| 4,347,060 A * | 8/1982 | Blizzard | B01D 7/00 23/294 R |
| 4,378,408 A | 3/1983 | Joedicke | |
| 4,708,812 A | 11/1987 | Hatfeld | |
| 4,916,014 A | 4/1990 | Weber et al. | |
| 5,000,999 A | 3/1991 | Hollander | |
| 5,240,760 A | 8/1993 | George et al. | |
| 5,310,803 A | 5/1994 | Hansen | |
| 5,356,664 A | 10/1994 | Narayan et al. | |
| 5,380,552 A | 1/1995 | George et al. | |
| 5,411,803 A | 5/1995 | George et al. | |
| 5,427,793 A | 6/1995 | Bigham et al. | |
| 5,456,785 A | 10/1995 | Venable | |
| 5,516,573 A | 5/1996 | George et al. | |
| 5,531,831 A * | 7/1996 | Sweeney | B05C 19/04 118/308 |
| 5,595,813 A | 1/1997 | Ogawa et al. | |
| 5,620,554 A | 7/1997 | Venable | |
| 5,643,399 A | 7/1997 | Venable | |
| 5,723,516 A | 3/1998 | Bigham et al. | |
| 5,770,295 A | 6/1998 | Alderman | |
| 5,962,143 A | 10/1999 | Krauthauser et al. | |
| 6,037,289 A | 3/2000 | Chopin et al. | |
| 6,063,312 A | 5/2000 | Mannheimer | |
| 6,143,318 A | 11/2000 | Gilchrist et al. | |
| 6,156,245 A | 12/2000 | Takebayashi et al. | |
| 6,174,360 B1 | 1/2001 | Sliwinski et al. | |
| 6,214,466 B1 | 4/2001 | Joedicke | |
| 6,245,381 B1 | 6/2001 | Israel | |
| 6,245,850 B1 | 6/2001 | Fields | |
| 6,296,912 B1 | 10/2001 | Zickell | |
| 6,362,121 B1 | 3/2002 | Chopin et al. | |
| 6,366,397 B1 | 4/2002 | Genjima et al. | |
| 6,376,075 B1 | 4/2002 | Tacke-Willemsen et al. | |
| 6,446,402 B1 | 9/2002 | Byker et al. | |
| 6,454,848 B2 | 9/2002 | Sliwinski et al. | |
| 6,465,088 B1 | 10/2002 | Talpaert et al. | |
| 6,500,555 B1 | 12/2002 | Khaldi | |
| 6,502,360 B2 | 1/2003 | Carr, III et al. | |
| 6,521,038 B2 | 2/2003 | Yanagimoto et al. | |
| 6,548,145 B2 | 4/2003 | Joedicke | |
| 6,569,520 B1 | 5/2003 | Jacobs | |
| 6,607,781 B2 | 8/2003 | Joedicke | |
| 6,653,356 B2 | 11/2003 | Sherman | |
| 6,680,134 B2 | 1/2004 | Maurer et al. | |
| 6,692,824 B2 | 2/2004 | Benz et al. | |
| 6,703,127 B2 | 3/2004 | Davis et al. | |
| 6,797,277 B2 | 12/2004 | Heier et al. | |
| 6,861,145 B2 | 3/2005 | Nastke et al. | |
| 6,933,007 B2 | 8/2005 | Fensel et al. | |
| 7,060,658 B2 | 6/2006 | Joedicke | |
| 7,070,843 B2 | 7/2006 | Bartek et al. | |
| 7,070,844 B2 | 7/2006 | Bartek | |
| 7,241,500 B2 | 7/2007 | Shiao et al. | |
| 7,335,419 B2 | 2/2008 | Azari et al. | |
| 7,452,598 B2 | 11/2008 | Shiao et al. | |
| 2002/0160151 A1 | 10/2002 | Pinault et al. | |
| 2003/0068469 A1 | 4/2003 | Aschenbeck et al. | |
| 2003/0091795 A1 | 5/2003 | Kiik et al. | |
| 2003/0152747 A1 | 8/2003 | Fensel et al. | |
| 2004/0009319 A1 * | 1/2004 | Zanchetta | B32B 9/00 428/40.1 |
| 2004/0076826 A1 | 4/2004 | Lee | |
| 2004/0170806 A1 | 9/2004 | Hittle et al. | |
| 2004/0255548 A1 | 12/2004 | Hong et al. | |
| 2004/0258835 A1 | 12/2004 | Hong et al. | |
| 2005/0072114 A1 | 4/2005 | Shiao et al. | |
| 2006/0251807 A1 | 11/2006 | Hong et al. | |
| 2007/0065640 A1 | 3/2007 | Joedicke | |
| 2007/0065641 A1 | 3/2007 | Joedicke | |

OTHER PUBLICATIONS

Ronnen Levinson, et al., "Solar Spectral Optical Properties of Pigments—Part II: Survey of Common Colorants".

* cited by examiner

SURFACING MEDIA WITH FLAME RETARDING EFFECTS AND HIGH SOLAR REFLECTANCE, AND METHOD OF MAKING SAME

CROSS-REFERENCE TO RELATED APPLICATIONS

This application is a division of U.S. patent application Ser. No. 12/059,194, filed Mar. 31, 2008, which claimed the priority of U.S. Provisional Application No. 60/909,876 filed Apr. 3, 2007.

BACKGROUND OF THE INVENTION

1. Field of the Invention

The present invention relates to bituminous roofing products such as asphalt-based roofing membranes, roofing shingles, and processes for making such roofing products.

2. Brief Description of the Prior Art

Asphalt-based roofing membranes are excellent waterproofing materials that have been extensively used in low-slope roofing systems to provide long-lasting and satisfactory roof coverings. Low-slope roofing systems are extensively used for commercial and industrial buildings. Examples of low-slope roofing systems are built-up roofs (BUR), modified bitumen roofs, and single-ply or membrane roofing systems. Asphalt-based roofing membranes are frequently used as waterproofing underlayment in low-rise roofing systems, as well as the uppermost or finish layer in built-up-roofs. The uppermost or "cap" sheet employed in membrane roofs often includes a layer of granular mineral material to protect the underlying roofing membrane.

Typically, bituminous roofing products are sheet goods that include a non-woven base or scrim formed of a fibrous material, such as a glass fiber mat. The base is coated with one or more layers of a bituminous material such as asphalt to provide water and weather resistance to the roofing product. Depending on the application, one side of the roofing product may be coated with mineral granules to provide durability, reflect heat and solar radiation, and to protect the bituminous binder from environmental degradation. Roofing granules can be embedded in the surface of such bituminous roofing products using conventional methods.

Mineral-surfaced asphalt shingles, such as those described in ASTM D225 or D3462, are generally used for steep-sloped roofs to provide water-shedding function while adding aesthetically pleasing appearance to the roofs. Conversely, roll goods such as asphalt-based roofing membranes are generally used for low-slope roofs. Pigment-coated mineral particles are commonly used as color granules in roofing applications to provide aesthetic as well as protective functions. Roofing granules are generally used in asphalt shingles or in roofing membranes to protect asphalt from harmful ultraviolet radiation.

Roofing products such as asphalt shingles and roll stock are typically composite articles including a non-woven glass fiber or felt web covered with a coating of water repellent bituminous material, and optionally surfaced with protective surfacing media. Surfacing media, such as inert mineral granules, fine sands, talc, limestone powder, calcium carbonate powder, or finely crushed rock powders, are typically used in roofing products to provide a tack-free surface for web-style manufacturing process, or the ability for packaging and storage. Some types of surfacing media, such as traditional roofing granules, can also provide UV protection to the covered asphalt binder and add aesthetic values to the end products. With the proper size and surface coverage of the roofing granules, it is reported that additional fire protection of the end products can be achieved. However, the resultant roofing products are known to have low solar reflectivity and hence will absorb significant solar heat especially through the infrared range of the solar spectrum. This phenomenon is increased as the granules covering the surface become dark in color. This is due in part to the rough surfaces created by typical roofing granules that can trap solar radiations and hence result in low solar reflectance. Although this phenomenon can be alleviated to a certain degree by reducing the granule size for a smoother surface, however, the benefit of increased fire resistance in end products would be greatly reduced. Also, other surfacing media are limited in providing high solar reflectance, adequate UV and fire protection to the end products without the aid of other ingredients, such as flame retardants added to the asphalt binder or the use of white protective coating.

Asphalt based roofing products have the challenge of meeting demanding fire resistance requirements set forth by national and international codes. One way in which fire resistance is improved is by adding fire retardant chemicals to the asphaltic materials themselves.

The fire resistance properties of roofing systems are typically measured using Underwriters' Laboratories 790 test method, Tests for Fire Resistance of Roof Covering Materials, which includes three test procedures, spread of flame, intermittent flame, and burning brand tests. This test employs a roof deck that slopes upward from the source of flame.

Laminated single-ply roofing membranes are known, such as those disclosed in U.S. Pat. Nos. 6,502,360; 5,456,785; 5,620,554; and 5,643,399. U.S. Pat. No. 6,296,912 discloses a roofing membrane having a fibrous layer on top for providing a secure surface for roof installation personnel.

Multilayer roofing membranes reinforced with polymeric materials are known. Such membranes are available, for example, faced with polyethylene film, or with mineral particles bonded to an underlying polyethylene film.

U.S. Pat. No. 4,218,502 discloses a moisture-resistant, intumescent fire retardant based on hydrated metal silicate coated with a protective coating comprising a metal salt with long-chain fatty acid. This fire retardant is dispersed within asphaltic coating material to form flame-retarded roofing products. U.S. Pat. No. 4,287,248 discloses a bituminized roofing sheet with improved flame resistance. The roofing sheet consists of a reinforced fleece, bitumen, and a metal foil placed on one face of the sheet. U.S. Pat. No. 5,000,999 discloses a bituminized roofing sheet having a metal foil applied to the bottom of the lower layer and optionally to the upper surface of the roofing sheet.

There is a continuing need for roofing materials that have improved resistance to fire while providing good weatherproofing characteristics.

SUMMARY OF THE INVENTION

In one aspect, the present invention provides a solar-reflective, fire-retardant roofing material comprising a base material having an upper surface, a fire-retardant particulate material applied to the upper surface of the base material, and a solar-reflective surface coating at least partially encapsulating the fire-retardant particulate material. In one embodiment, the fire-retardant particulate material is partially embedded in and partially protruding from the solar reflective surface coating. In another presently preferred embodiment, the fire-retardant particulate material is fully encapsulated in the solar reflective surface coating. Preferably, the fire-retardant material is selected from the group consisting of hydrated metal silicates, alumina hydrates, antimony-containing compounds, phosphorous-containing compounds, and halogenated compounds. Preferably, the solar reflective coating is formed from a solar-reflective coating composition including at least one solar-reflective pigment. Preferably, the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina. Preferably, in one aspect the solar reflective coating composition comprises at least one binder material selected from the group consisting of metal silicate compositions, silicas, phosphates, and polymeric binder compositions. It is preferred in another aspect that the polymeric binder composition be selected from the group consisting of polyurethanes, poly(meth)acrylates, polysilicones, fluoropolymers, and polyvinyl chloride.

In another aspect, the present invention provides a first method of making solar-reflective, fire-retardant roofing materials. This first method comprises providing a base material having an upper surface, applying a solar-reflective surface coating composition to the upper surface of the base material, depositing a fire-retardant particulate material on the upper surface of the base material in the solar-reflective surface coating composition, and curing the solar-reflective surface coating composition to at least partially encapsulate the fire-retardant particulate material. Preferably, in this method the fire-retardant material is selected from the group consisting of hydrated metal silicates, alumina hydrates, antimony-containing compounds, phosphorous-containing compounds, and halogenated compounds. Preferably, in this method the solar-reflective coating composition includes at least one solar-reflective pigment. Preferably, in this method the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina. Preferably, in this method in one aspect the solar reflective coating composition comprises at least one binder material selected from the group consisting of metal silicate compositions, silicas phosphates, and polymeric binder compositions. Preferably, in another aspect of this method the polymeric binder material is selected from the group consisting of polyurethanes, poly(meth)acrylates, polysilicones, fluoropolymers, and polyvinyl chloride.

In another aspect, the present invention provides a second method of making solar-reflective, fire-retardant roofing materials. This second method comprises providing a fire-retardant particulate material, applying a solar-reflective surface coating composition to fire-retardant particulate material, curing the solar-reflective surface coating composition to at least partially encapsulate the fire-retardant particulate material with a solar-reflective surface coating, and depositing the encapsulated fire-retardant particulate material on the upper surface of the base material. Preferably, in this method the fire-retardant material is selected from the group consisting of hydrated metal silicates, alumina hydrates, antimony-containing compounds, phosphorous-containing compounds, and halogenated compounds. Preferably, in this method the solar reflective coating is formed from a solar-reflective coating composition including at least one solar-reflective pigment. Preferably, in this method the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina. Preferably, in one aspect of this method the solar reflective coating composition comprises at least one binder material selected from the group consisting of metal silicate compositions, silicas phosphates, and polymeric binder compositions. Preferably, in another aspect of this method the polymeric binder composition is selected from the group consisting of polyurethanes, poly(meth)acrylates, polysilicones, fluoropolymers, and polyvinyl chloride.

In another aspect, the present invention provides a method of coating a substrate surface. In this aspect, the method comprises providing a substrate surface, applying a liquid surface coating composition to the substrate surface, depositing a fire-retardant particulate material on an upper surface of the liquid surface coating, at least partially encapsulating the fire-retardant particulate material, and causing the liquid surface coating to cure to a solid state, whereby a tack-free time of a thusly coated substrate surface is shorter than the tack-free time of a coated substrate surface cured without the fire-retardant particulate material deposited thereon. Preferably, the substrate surface comprises a roofing material. Preferably, the liquid surface coating composition is a solar-reflective coating composition in a cured state. It is preferred that the solar reflective coating composition include at least one solar-reflective pigment. In this method, it is preferred that the fire-retardant particulate material be selected from the group consisting of intumescent and non-intumescent fire-retardant materials.

In yet another aspect, the present invention provides a granular particulate material for surfacing roofing materials, the particulate comprising fire-retardant material at least partially encapsulated in a solar-reflective coating. In one embodiment, the fire-retardant material is preferably selected from the group consisting of hydrated metal silicates, alumina hydrates, antimony-containing compounds, phosphorous-containing compounds, and halogenated compounds. In another aspect, the fire-retardant material can be selected from the group consisting of intumescent and non-intumescent fire retardant materials. Preferably, the solar reflective coating is formed from a solar-reflective coating composition including at least one solar-reflective pigment. Preferably, the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina. Preferably, the at least one solar reflective pigment has an integrated reflectance of at least about 50% over the wavelength range from 700 to 2500 nm. Preferably, in one aspect the solar reflective coating composition comprises at least one binder material selected from the group consisting of metal silicate compositions, silicas, phosphates, and polymeric binder compositions. Preferably, in another aspect the polymeric binder composition is selected from the group consisting of polyurethanes, poly(meth)acrylates, polysilicones, fluoropolymers, and polyvinyl chloride.

DETAILED DESCRIPTION

The present invention provides improved fire resistance to asphalt-based roofing materials. In particular, the present invention provides a granular particulate material for surfacing roofing materials or "surfacing media" with high solar reflectance and flame retardant properties asphaltic coating materials. The surfacing media is prepared by at least partially encapsulating suitable fire retardant materials with suitable reflective, protective coatings to provide durable, solar-reflective particulates. In addition, suitable exterior-grade fire retardants with high solar reflectance can be directly used as the surfacing media. Furthermore, a fire retardant particulate according to the present invention can be mixed with other non-flammable particles, e.g., sands, crushed rocks, talc, clay, etc., to form a mixture of surfacing media that provide adequate flame retarding and reflective properties.

In another aspect, the present invention provides a first method of making solar-reflective, fire-retardant roofing materials. In this first method, surfacing media according to the present invention are deposited onto hot asphalt surfaces to form desirable tack-free surfaces during the manufacturing of roofing products.

In yet another aspect, the present invention provides a second method of making solar-reflective, fire-retardant roofing materials. In this second method, surfacing media according to the present invention are deposited in wet coatings or films that have been applied to a roofing product to provide a tack-free and solar reflective surface with enhanced fire resistance. Advantageously, the surfacing media can shorten the open time of the wet coatings prior to the contact of roller surfaces and thus may be enabling faster processing time.

Surfacing material particles according to the present invention preferably have proper particle size or size range to provide the end surface with tack-free property, adequate UV protection, and to prevent the staining of asphalt oils when the products are stacked for storage or in outdoor exposures. Preferably, the surfacing media particles have a particle size from US mesh #8 to US mesh #325.

Preferably, the surfacing media particles are formed from fire retardant materials having good thermal stability and adequate crushing strength to endure the manufacturing process and normal foot traffic in roofing applications. Examples of suitable fire retardant materials include, but not limited to, hydrated metal silicates, alumina hydrates, antimony-containing compounds, phosphorous-containing compounds, and halogenated compounds. Examples of fire retardant materials include that can be employed in the compositions and processes of the present invention include aluminum trihydrate, magnesium trioxide, antimony trioxide, antimony pentoxide, decabromodiphenyloxide, phosphates such as alkali metal phosphates, alkaline earth metal phosphates, ammonium phosphates, such as monoammonium phosphate and diammonium phosphate, borates such as borax, bromated phosphorous complex, and halogenated hydrocarbons such as halogenated paraffin.

Preferably, the fire retardant material is at least partially encapsulated using a coating composition having excellent outdoor stability and good mechanical strength. Encapsulation methods known in the art, such as those disclosed for example in U.S. Patent Publication No. 2006/0251807, which is incorporated herein by reference, can be employed. Techniques for microencapsulating solid particles are disclosed, for example, in G. Beestman, "Microencapsulation of Solid Particles," *Controlled-Release Delivery Systems for Pesticides*, (H. B. Scher, Ed., Marcel Dekker, Inc. New York 1999) pp. 31-54, Kirk-Othmer Encyclopedia of Chemical Technology, 4th Edition; as well in U.S. Pat. Nos. 6,156,245, 6,797,277, and 6,861,145.

Preferably, the coating composition employed for at least partially encapsulating the fire retardant material forms a coating barrier which resists diffusion through the barrier and the leaching of the fire retardant material from the surfacing media particles, as well as the intrusion of moisture into the surfacing media particles. Preferably, the coating composition is pigmented for high solar reflectance by including at least one solar reflective pigment. Preferably, the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina. Preferably, the at least one solar reflective pigment has an integrated reflectance of at least about 50% over the wavelength range from 700 to 2500 nm. In addition, it is preferred that the coating composition not interfere with the fire retarding mechanism of the fire retardant material at the core of the surfacing media particles. Further, it is preferred that the coating composition provide a coating that has good adhesion to the asphalt substrate. Examples of the suitable protective coating binder materials include, but not limited to, inorganic protective coating binders such insolubilized metal silicate compositions, silicas, phosphates, and polymeric binder compositions, and organic protective coating binders such as polyurethanes, acrylics, polyvinylchloride, and silicone coating materials.

One presently preferred surfacing media according to the present invention is provide by hydrous sodium silicate coated by phosphate binder pigmented with titanium dioxide for high solar reflectivity. In particular a hydrous sodium silicate such as Britesil $H_2O$ from PQ Corp. can be encapsulated using titanium dioxide-pigmented magnesium or aluminum phosphate in a fluidized bed coater to produce durable, white surfacing media that upon contact with flame will be intumescent to form a barrier to retard further advances of the flames.

To make the flame retarded roofing products with surfacing media particles according to the present invention, the surfacing media particles can be deposited onto a moving web of felt coated with molten asphalt, and then press the surfacing media particles with pressing roll under suitable pressure into the molten asphalt surface to form a uniform, tack-free surface. Preferably, the surface coverage of the surfacing media particles is greater than 80% to achieve a highly solar reflective surface. Further, it is preferred that cooling be employed to prevent the surfacing media particulate from the loss or reduction of their effectiveness as fire retardants through thermal degradation during manufacture of the roofing materials. For example, the web including a molten asphalt coating can be cooled using, for example, air knife or a water mist, just after the surfacing media particulate has been deposited to help prevent the said particulates from the loss of their flame retarding properties from overheating.

In another aspect of the present invention, the surfacing media particles can be used to form a tack-free, highly reflective, and flame retarded surface by deposited those surfacing media particles directly onto wet coating or adhesives that are applied to a roofing product in factory or field conditions.

Other methods of making suitable flame-retarded surfaces with high solar reflectivity using the said particulates will become apparent to those who are skilled in the art.

Referring now to the drawings, in which like reference numerals refer to like elements in each of the several views, there are shown schematically in FIGS. 3, 4, 5 and 6 examples of solar-reflective, fire-retardant roofing materials according to the present invention.

Figure 3:
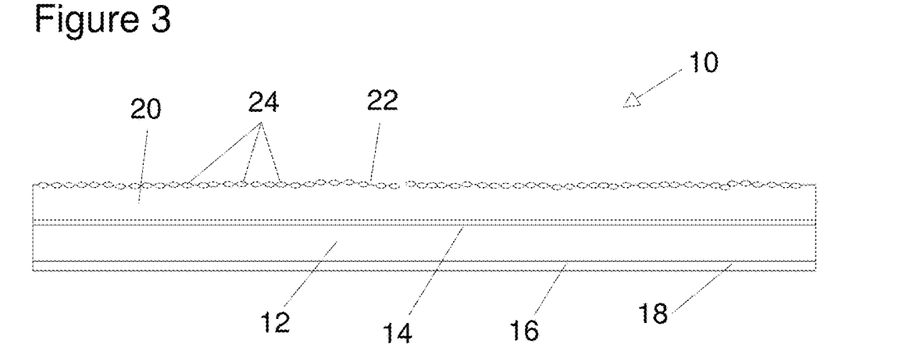
FIG. 3 is a schematic sectional elevation view of an improved fire resistant roofing material according to a first embodiment of the present invention.

FIG. 3 is a schematic cross-sectional representation of a first embodiment of fire-retardant roofing material 10 according to the present invention. In a first presently preferred embodiment the fire-retardant roofing material 10 comprises a first or lower layer of asphaltic material 12, a reinforcing web 14, such as a reinforcing web formed from nonwoven glass fibers, and a second or upper layer of asphaltic material 20 having a top surface 22. The lower layer 12 is formulated to be slightly tacky and self-adhesive at application temperatures. The bottom surface 16 of the lower layer of asphaltic material 12 is covered with a sheet of release material 18. The upper surface 22 of the upper layer 20 is covered with a plurality of fire-retardant surfacing material particles 24 according to the present invention. The particles 24 are applied to the upper surface 22 of the upper layer of asphaltic material 20 while the asphaltic material is still molten, or at least warm and tacky, and the particles 24 are subsequently pressed into the upper surface 22 of the upper layer of asphaltic material 20 using a suitable roller (not shown). The fire-retardant surfacing material particles 24 include a fire-retardant particulate covered with a solar-reflective surface coating.

Figure 7:
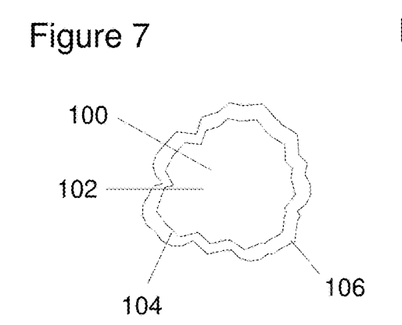
FIG. 7 is a schematic sectional elevation view of a fire retardant surfacing material according to a first embodiment of the present invention.

In one presently preferred embodiment, as shown in the schematic sectional elevation representation of FIG. 7, the fire-retardant surfacing material particles comprise a granular particulate material 100, having a core 102 formed from a fire-retardant particulate such as antimony trioxide, and having an outer surface 104 covered with a solar reflective coating 106 formed from a suitable binder such as an polyacrylate coating binder in which are dispersed particles of at least one solar reflective pigment such as rutile titanium dioxide. In this embodiment, the solar reflective coating 106 completely encapsulates the outer surface 104 of the fire-retardant particulate core 102.

Figure 8:
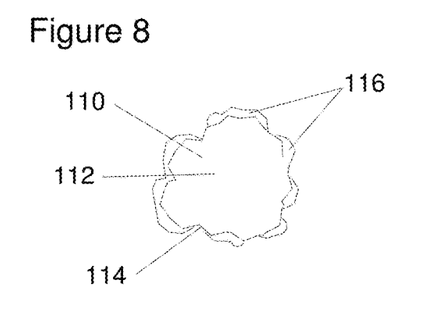
FIG. 8 is a schematic sectional elevation view of a fire retardant surfacing material according to a second embodiment of the present invention.

In another presently preferred embodiment, as shown in the schematic sectional elevation representation of FIG. 8, the fire-retardant surfacing material particles comprise a granular particulate material 110, having a core 112 formed from a fire-retardant particulate such as a hydrated metal silicate, and having an outer surface 114 partially covered with a solar reflective coating 116 formed from a suitable binder such as an polyurethane coating binder in which are dispersed particles of at least one solar reflective pigment such as a silica encapsulated metal flake pigment. In this embodiment, the solar reflective coating 116 only partially encapsulates the outer surface 114 of the fire-retardant particulate core 112.

Figure 4:
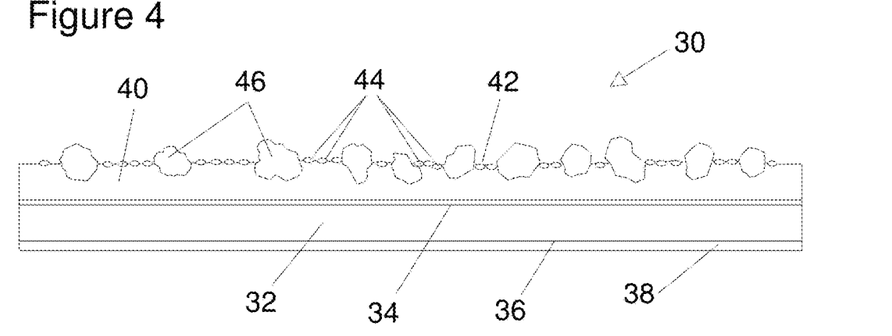
FIG. 4 is a schematic sectional elevation view of an improved fire resistant roofing material according to a second embodiment of the present invention.

FIG. 4 is a schematic cross-sectional representation of a second embodiment of fire-retardant roofing material 30 according to the present invention. In this second presently preferred embodiment the fire-retardant roofing material 30 comprises a first or lower layer of asphaltic material 32, a reinforcing web of a nonwoven glass fibers 34, and a second or upper layer 40 of asphaltic material having a top surface 42. The lower layer 32 is formulated to be slightly tacky and self-adhesive at application temperatures. The bottom surface 36 of the lower layer of asphaltic material 32 is covered with a sheet of release material 38. The upper surface 42 of the upper layer 40 is covered with a plurality of fire-retardant surfacing material particles 44 according to the present invention. In addition, a plurality of conventional colored roofing granules 46 are partially embedded in the upper surface 42 of the upper layer 40. The particles 44 are applied to the upper surface 42 of the upper layer of asphaltic material 40 while the asphaltic material is still molten, or at least warm and tacky, after the roofing granules 46 have been deposited on the upper layer 40. The fire-retardant surfacing material particles 44 include a fire-retardant particulate covered with a solar-reflective surface coating. In some instances, the fire-retardant particulate can itself contribute to the solar reflectivity of the solar-reflective surface coating.

Figure 5:
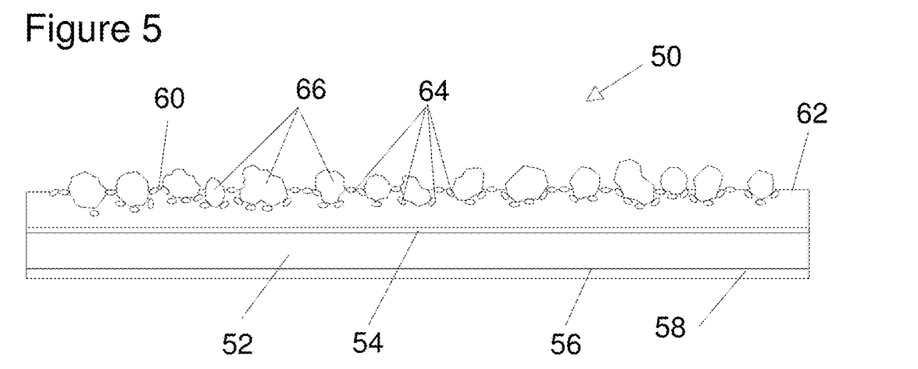
FIG. 5 is a schematic sectional elevation view of an improved fire resistant roofing material according to a third embodiment of the present invention.

FIG. 5 is a schematic cross-sectional representation of a third embodiment of fire-retardant roofing material 50 according to the present invention. In this third presently preferred embodiment the fire-retardant roofing material 50 comprises a first or lower layer of asphaltic material 52, a reinforcing web of nonwoven glass fibers 54, and a second or upper layer 60 of asphaltic material having a top surface 62. The lower layer 52 is formulated to be slightly tacky and self-adhesive at application temperatures. The bottom surface 56 of the lower layer of asphaltic material 52 is covered with a sheet of release material 58. The upper surface 62 of the upper layer 60 is covered with a plurality of fire-retardant surfacing material particles 64 according to the present invention. In addition, a plurality of conventional colored roofing granules 66 are partially embedded in the upper surface 62 of the upper layer 60. The particles 64 are applied to the upper surface 62 of the upper layer of asphaltic material 60 while the asphaltic material is still molten, or at least warm and tacky. Before the roofing granules 66 are deposited on the upper layer 60, the particles 64 are pressed into the upper surface 62 of the upper layer of asphaltic material 60 using a suitable roller (not shown). The fire-retardant surfacing material particles 64 include a fire-retardant particulate covered with a solar-reflective surface coating.

Figure 6:
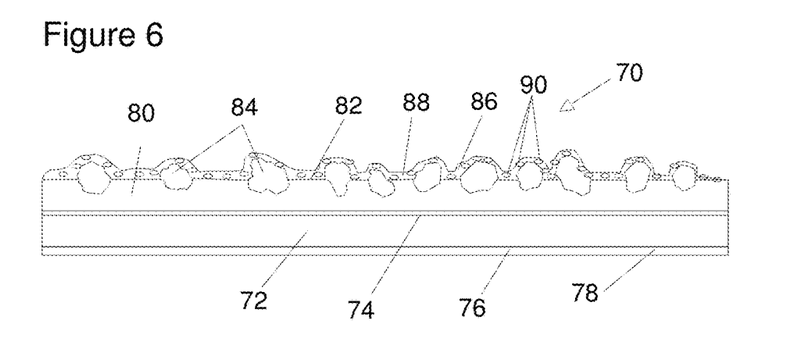
FIG. 6 is a schematic sectional elevation view of an improved fire resistant roofing material according to a fourth embodiment of the present invention.

FIG. 6 is a schematic cross-sectional representation of a fourth embodiment of fire-retardant roofing material 70 according to the present invention. In this fourth presently preferred embodiment the fire-retardant roofing material 70 comprises a first or lower layer of asphaltic material 72, a reinforcing web of a nonwoven glass fibers 74, and a second or upper layer 80 of asphaltic material having a top surface 82. The lower layer 72 is formulated to be slightly tacky and self-adhesive at application temperatures. The bottom surface 76 of the lower layer of asphaltic material 72 is covered with a sheet of release material 78. A plurality of conventional colored roofing granules 84 are partially embedded in the upper surface 82 of the upper layer 80. The upper surface 82 of the upper layer 80 is covered with a coating 86 comprising a suitable coating binder 88 such as a polyacrylate. At least one solar-reflective pigment is optionally dispersed in the coating binder 88. Dispersed in the coating binder 88 are a plurality of fire-retardant surfacing material particles 90 according to the present invention. In one presently preferred embodiment, the fire-retardant surfacing material particles 90 include a fire-retardant particulate covered with a solar-reflective surface coating, such as shown in FIG. 7 or FIG. 8. In other presently preferred embodiment, the fire-retardant surfacing material particles 90 do not include a solar-reflective coating. However, in this embodiment at least one solar-reflective pigment is dispersed in the coating binder 88.

The roofing granules 84 are deposited on the upper surface 82 of the upper layer of asphaltic material 80 while the asphaltic material is still molten, or at least warm and tacky. A coating composition is subsequently applied over the upper surface 82 to form the coating 86. In one presently preferred embodiment of the method of the present invention, the fire-retardant surfacing material particles 90 are dispersed in the coating composition before the coating composition is applied to the upper surface 82 of the upper layer 80. In another presently preferred embodiment of the method of the present invention, the fluid coating composition is applied to the upper surface 82 of the upper layer 80, and before the coating composition solidifies, as by film formation or cooling, the fire-retardant surfacing material particles 90 are deposited onto the surface of the coating composition, and thus become at least partially embedded in the coating composition.

The bituminous material used in manufacturing roofing products according to the present invention is derived from a petroleum processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, oils, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The bituminous material can optionally include one or more fire retardant or fire resistant materials The solar-reflective fire-retardant roofing material is not limited to the embodiments previously disclosed. For example, the base material can include a plurality of layers. Further, the fire-retardant roofing material can be incorporated into other membranes making up a roofing system for sloped roofs or in membranes used in a built up roof, or cut into roofing shingles. The present invention would also be beneficial in membranes that do not contain a self-adhering layer to increase fire retardant properties. Other materials may be added, such as layers of polymeric material, to enhance the properties of the fire-retardant roofing material, such as added strength, durability, or fire resistance.

The reinforcing web can be prepared by any suitable technique known in the art. Acceptable materials for use as a reinforcing web include reinforced polyester mesh, flashing fabric, a nonwoven scrim of polypropylene fibers, or other synthetic fabric as is known in the art. The reinforcing web preferably includes a nonwoven mat with reinforcement strands for added dimensional stability, for example, a glass reinforced scrim manufactured by Johns Manville®.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. Such processes can be employed to form the fire-retardant roofing material of the present invention.

Figure 9:
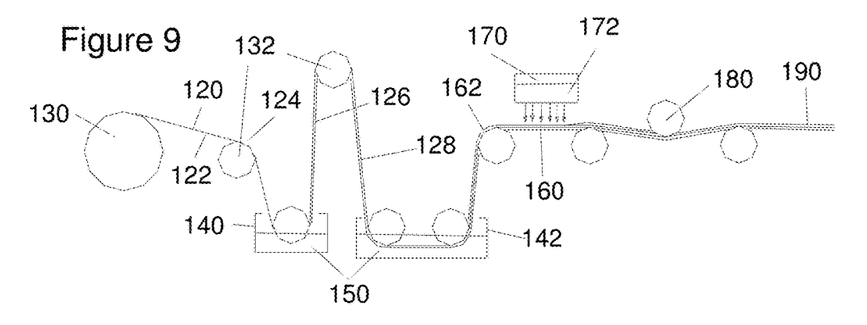
FIG. 9 is a schematic sectional elevation view of a process for preparing an improved fire resistant roofing material according to the present invention.

Conventional roofing production processes can be employed in the manufacture of the fire-retardant roofing material of the present invention as depicted in FIG. 9. A web of non-woven material 120 is fed from a roll 130 over a series of rollers 132 and immersed in a first tank 140 and second tank 142 each containing molten asphaltic material 150 to coat the lower side 122 and the upper side 124 with a lower layer of asphaltic material 126 and an upper layer of asphaltic material 128 respectively to form an asphalt coated web 160. A releasable backing sheet (not shown) can be applied at any point following the asphalt coating step. After the coating step and while the coating material is still hot, soft and tacky, the upper surface 162 of the asphalt coated web 160 is passed beneath a hopper 170 containing a fire retardant particulate material 172 which is dropped onto the upper surface 162. Subsequently, a slate roll 180 forces the fire-retardant particulate into the upper surface of the web to form a solar-reflective, fire-retardant roofing material 190 according to the present invention. The solar-reflective, fire-retardant roofing material is then cooled and optionally wrapped into rolls for shipping. Optionally, the upper surface 162 of the asphalt coated web 160 can be passed below a surfacing apparatus (not shown) from which decorative granules are deposited on the upper surface 162, either before or after application of the fire retardant particulate.

The stabilized asphaltic material 150 suitably has a softening point as measured by ASTM D36 of from about 195 degrees F. to 260 degrees F., more preferably from about 215 degrees F. to 235 degrees F. This coating is advantageously maintained at about 380 degrees F. to 450 degrees F. before application to the web.

The following example is provided to better disclose and teach processes and compositions of the present invention. The example is for illustrative purposes only, and it must be acknowledged that minor variations and changes can be made without materially affecting the spirit and scope of the invention as recited in the claims that follow.

EXAMPLE

Figure 1:
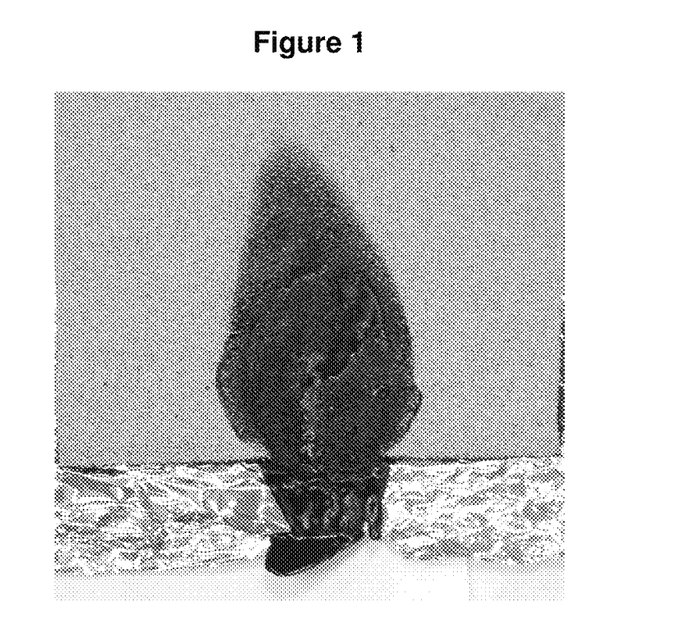
FIG. 1 is a photograph of a prior art roofing material shown after a flame test.
Figure 2:
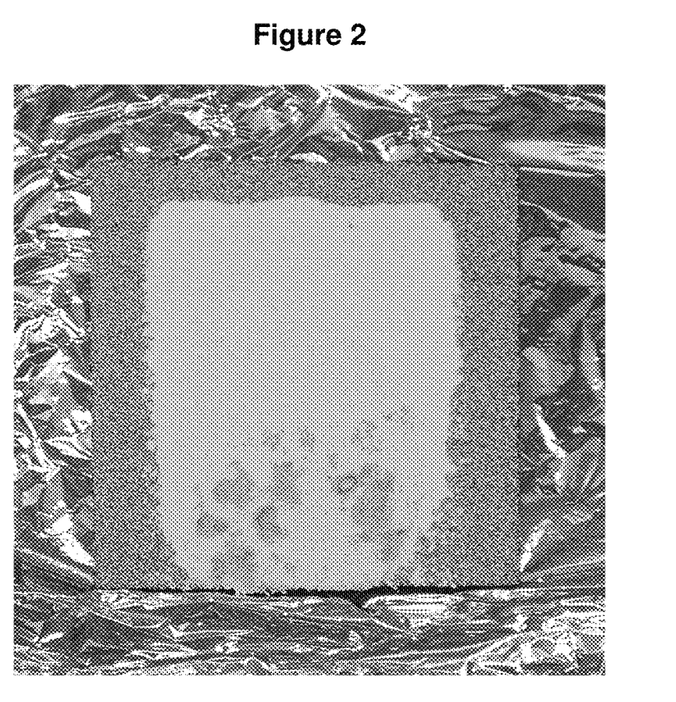
FIG. 2 is a photograph of a roofing material according to the present invention shown after a flame test.

A white granule-surfaced roofing cap sheet (White Diamond from CertainTeed Corp., Little Rock, Ark.) was found to have solar reflectance of 29.6% as measured by the ASTM C1549 method. The membrane also has flame testing characteristics of 6.5"×4" flame spreading, asphalt coating dripping after 51 second, 10 seconds of self-burning after test is stopped, and no charring, as shown in the photograph of FIG. 1, when tested according to an in-house fire test. The sample was then coated with a white acrylic coating containing no flame retardant (Roofing Coating 2540, available from Rohm & Haas, Spring House, Pa.) using a 6-mil drawdown bar (available from BYK Gardner, Columbia, Md.). While the coating was still wet, surfacing media of hydrated sodium silicate (Britesil $H_2O$ from PQ Corp. King of Prussia, Pa.) was evenly deposited on to the coating surface. Excess surfacing medium was removed by inverting the coated sample. The surface was then pressed by a 4-lb roller. An in-house bleed through test indicated that the surface is >99% tack free and little coating was found to transfer to the pressing roll. After the coating was dried, the surface has a solar reflectance of 75.2% (ASTM C-1549 method). When tested by the same in-house flame test, the surface has no flame spreading, no self-burning after test, no asphalt coating dripping, and significant intumescence for flame retardation, as can be seen in the photograph of FIG. 2.

Various modifications can be made in the details of the various embodiments of the processes, compositions and articles of the present invention, all within the scope and spirit of the invention and defined by the appended claims.

The invention claimed is:

1. A method of making solar-reflective, fire-retardant roofing materials, the method comprising:
   (a) providing a base material having an upper surface formed of bituminous material, a plurality of roofing granules being partially embedded in the upper surface of the base material; and then
   (b) applying a fluid solar-reflective surface coating composition to the upper surface of the base material, wherein the fluid solar-reflective coating composition includes at least one solar-reflective pigment, such that the fluid solar-reflective surface coating composition coats the upper surface of the base material and the granules; and then
   (c) depositing a fire-retardant particulate material on the fluid solar-reflective surface coating composition, the fire-retardant material being selected from the group consisting of hydrated meta silicates, alumina hydrates, antimony-containing compounds, phosphorous-containing compounds, and halogenated compounds, the deposition being performed such that the fire-retardant particulate material becomes at least partially embedded in the fluid solar-reflective coating composition; and then
   (d) curing the fluid solar-reflective surface coating composition to a solid state to form a solar-reflective exterior coating disposed on the upper surface of the base material, the solar-reflective exterior coating to at least partially encapsulate the fire-retardant particulate material in the solar-reflective exterior coating.

2. A method according to claim 1 wherein the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina.

3. A method according to claim 1 wherein the solar reflective coating composition comprises at least one binder material selected from the group consisting of metal silicate compositions, silicas, phosphates, and polymeric binder compositions.

4. A method according to claim 1 wherein the fire-retardant particulate material is selected from the group consisting of intumescent fire-retardant materials.

5. A method according to claim 1, wherein in step (c), the fire-retardant particulate material becomes fully embedded in the fluid solar-reflective coating composition; and in step (d), the curing of the fluid solar-reflective surface coating composition fully encapsulates the fire-retardant particulate material in the solar-reflective exterior coating.

6. A method according to claim 1 wherein the fluid solar reflective coating composition comprises a polymeric binder.

7. A method according to claim 6 wherein the polymeric binder is selected from the group consisting of polyurethanes, poly(meth)acrylates, polysilicones, fluoropolymers, and polyvinyl chloride.

8. A method according to claim 1, wherein the fire-retardant particulate material is only partially encapsulated in the solar-reflective exterior coating.

9. A method according to claim 8, wherein a tack-free time of a thusly coated upper surface of a base material is shorter than the tack-free time of a coated substrate surface cured without the fire-retardant particulate material deposited thereon.

10. A method according to claim 8, wherein the fire-retardant particulate material has a particle size from US mesh #8 to US mesh #325.

11. A method according to claim 1, wherein the fire-retardant particulate material is selected from the group consisting aluminum trihydrate, magnesium trioxide, antimony trioxide, antimony pentoxide, decabromodiphenyloxide, phosphates, alkaline earth metal phosphates, ammonium phosphates, borates, bromated phosphorous complex, and halogenated hydrocarbons.

12. A method according to claim 1, wherein the solar-reflective exterior coating composition having the fire-retardant particulate material at least partially encapsulated therein forms the top surface of the solar-reflective, fire-retardant roofing material.

13. A method according claim 1, wherein
   the at least one solar reflective pigment is selected from the group consisting of titanium dioxide, pearlescent pigments including mica, pearlescent pigments including titanium dioxide, mirrorized silica pigments based upon metal-doped silica, silica encapsulated metal flake pigments, and alumina;
   the fire-retardant particulate material is selected from the group consisting of hydrated metal silicates, alumina hydrates, antimony-containing compounds, phosphorous-containing compounds, and halogenated compounds; and
   the fluid solar reflective coating composition comprises a polymeric binder.

14. A method according to claim 13 wherein the polymeric binder is selected from the group consisting of polyurethanes, poly(meth)acrylates, polysilicones, fluoropolymers, and polyvinyl chloride.

15. A method according to claim 14, wherein the fire-retardant particulate material is only partially encapsulated in the solar-reflective exterior coating, and wherein a tack-free time of a thusly coated upper surface of a base material is shorter than the tack-free time of a coated substrate surface cured without the fire-retardant particulate material deposited thereon.

16. A method according to claim 14, wherein in step (c), the fire-retardant particulate material becomes fully embedded in the fluid solar-reflective coating composition; and in step (d), the curing of the fluid solar-reflective surface coating composition fully encapsulates the fire-retardant particulate material in the solar-reflective exterior coating.

* * * * *